United States Patent
Oroskar et al.

(10) Patent No.: US 10,524,230 B1
(45) Date of Patent: Dec. 31, 2019

(54) DYNAMIC PAGING CONCATENATION METHODS AND SYSTEMS

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 24 days.

(21) Appl. No.: 15/629,655

(22) Filed: Jun. 21, 2017

(51) Int. Cl.
*H04W 68/02* (2009.01)
*H04W 76/19* (2018.01)

(52) U.S. Cl.
CPC ........... *H04W 68/02* (2013.01); *H04W 76/19* (2018.02)

(58) Field of Classification Search
CPC .......................... H04W 68/02; H04W 76/028
USPC .......................................... 455/458; 340/7.43
See application file for complete search history.

(56) References Cited

U.S. PATENT DOCUMENTS

| | | | |
|---|---|---|---|
| 5,111,197 A | 5/1992 | Ichikawa | |
| 5,369,681 A | 11/1994 | Boudreau et al. | |
| 5,673,259 A | 9/1997 | Quick, Jr. | |
| 5,884,170 A | 3/1999 | Valentine et al. | |
| 5,889,783 A | 3/1999 | Maloney et al. | |
| 6,088,589 A | 7/2000 | Valentine et al. | |
| 6,138,034 A | 10/2000 | Willey | |
| 6,181,945 B1 | 1/2001 | Lee | |
| 6,188,885 B1 | 2/2001 | Kolev et al. | |
| 6,515,972 B1 * | 2/2003 | Gage ..................... | H04W 99/00 370/328 |
| 6,687,339 B2 | 2/2004 | Martin | |
| 6,711,413 B1 | 3/2004 | Heidari | |
| 6,745,039 B1 | 6/2004 | Di Lalla | |
| 6,847,622 B1 * | 1/2005 | Emmons, Jr. ......... | H04B 7/264 370/335 |
| 6,856,789 B2 | 2/2005 | Pattabiraman et al. | |
| 6,963,750 B1 | 11/2005 | Cheng et al. | |
| 7,366,526 B2 | 4/2008 | Zhang et al. | |
| 7,583,984 B2 | 9/2009 | Sun et al. | |
| 7,983,696 B1 | 7/2011 | Manghat et al. | |

(Continued)

OTHER PUBLICATIONS

Cai et al., "Mitigating DoS Attacks on the Paging Channel by Efficient Encoding in Page Messages," Computer Science Department, International Conference on Security and Privacy in Communication Systems. Springer, Berlin, Heidelberg, 2009, 20 pages.

(Continued)

*Primary Examiner* — Inder P Mehra

(57) ABSTRACT

Methods and systems disclosed herein can help to dynamically adjust the degree of or enable/disable concatenation of page messages, depending upon whether a user equipment is operating as a single radio LTE (SRLTE) device. An exemplary method involves a radio access network: (i) determining that a UE is configured to use a single radio system for both (a) data communication under a first air interface protocol, and (b) voice calls under a second air interface protocol that is different from the first air interface protocol, (ii) based at least in part on the determination, selecting a page-concatenation level to be used to page the first UE, and (iii) transmitting at least on page message to the UE according to the selected page-concatenation level.

15 Claims, 6 Drawing Sheets

(56) References Cited

U.S. PATENT DOCUMENTS

| | | |
|---|---|---|
| 8,000,684 B1 | 8/2011 | Bhan et al. |
| 8,203,963 B1 | 6/2012 | Oroskar et al. |
| 8,306,558 B1 | 11/2012 | Oroskar et al. |
| 8,355,740 B1 | 1/2013 | Oroskar et al. |
| 8,670,788 B1 | 3/2014 | Oroskar et al. |
| 8,682,358 B1 | 3/2014 | Shah et al. |
| 2005/0164741 A1 | 7/2005 | Rajkotia et al. |
| 2006/0018347 A1 | 1/2006 | Agrawal |
| 2006/0251033 A1 | 11/2006 | Oprescu-Surcobe et al. |
| 2007/0057767 A1 | 3/2007 | Sun et al. |
| 2007/0060175 A1 | 3/2007 | Park et al. |
| 2007/0202849 A1 | 8/2007 | Moeller |
| 2007/0233323 A1 | 10/2007 | Wiemeyer et al. |
| 2007/0268897 A1* | 11/2007 | Nishikawa ............ H04L 47/522 370/389 |
| 2008/0032713 A1 | 2/2008 | Yang |
| 2008/0096520 A1 | 4/2008 | Benco et al. |
| 2008/0188247 A1 | 8/2008 | Worrall |
| 2008/0293437 A1 | 11/2008 | Ranganathan et al. |
| 2008/0317144 A1 | 12/2008 | Huang et al. |
| 2009/0106798 A1 | 4/2009 | Nabatani et al. |
| 2009/0181701 A1 | 7/2009 | Willey et al. |
| 2010/0128621 A1 | 5/2010 | Hamabe et al. |
| 2013/0021925 A1 | 1/2013 | Yin et al. |
| 2013/0059584 A1* | 3/2013 | Jamadagni et al. ........................ H04L 12/1482 455/407 |
| 2013/0288731 A1 | 10/2013 | Chu |
| 2013/0308781 A1* | 11/2013 | Kristiansson ......... H04L 63/104 380/270 |
| 2014/0198753 A1* | 7/2014 | Faccin .................. H04W 48/20 370/329 |
| 2015/0140963 A1* | 5/2015 | Wu ..................... H04L 12/1482 455/407 |
| 2015/0270877 A1 | 9/2015 | Hessler et al. |
| 2015/0341149 A1 | 11/2015 | Chatterjee et al. |
| 2016/0080430 A1* | 3/2016 | Zisimopoulos et al. ...................... H04W 99/00 370/328 |
| 2016/0150181 A1* | 5/2016 | Jeong ...................... H04N 7/14 348/14.02 |
| 2017/0164326 A1* | 6/2017 | Worrall ................ H04W 68/00 |

OTHER PUBLICATIONS

Poole, Ian. "4G LTE CoMP, Coordinated Multipoint Tutorial," 2015, 6 pages (http://www.radio-electronics.com/info/cellulartelecomms/).

* cited by examiner

DYNAMIC PAGING CONCATENATION METHODS AND SYSTEMS

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

In accordance with the air interface protocol, each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

Further, each base station in such a RAN may be communicatively linked with a signaling controller that carries out various network control functions, such as managing setup of bearer connections between the base station and one or more transport networks, tracking where UEs are located in the RAN, paging UEs, and the like. In addition, neighboring base stations may be communicatively linked with each other, to facilitate handover and other inter-base station signaling.

By way of example, in an LTE RAN, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE RAN would sit on a wireless service provider's core packet-switched network (e.g., a network compliant with the industry standard system architecture evolution (SAE) for the LTE protocol), and so the base station and each other RAN entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network.

Once a UE is so attached with a base station, the base station then serves the UE on one or more carriers, managing downlink communication of packet data to the UE and uplink communication of packet data from the UE. For example, as the gateway system receives packet data destined to the UE, the gateway system may forward the packet data to the base station, and the base station may schedule and provide transmission of that data to the UE on the UE's serving carrier(s). Likewise, as the UE has packet data to transmit on the transport network, the UE may transmit a scheduling request to the base station, the base station may schedule transmission of that data from the UE on the UE's serving carrier(s), the UE may accordingly transmit the data to the base station, and the base station may then forward the data to the gateway system for output on the transport network.

In order to utilize legacy cellular networks, a service provider may implement a hybrid wireless communication system that includes multiple separate but interconnected RANs. For example, a service provider may implement a first RAN that provides high speed data communications, and a second RAN that provides traditional telephony service, with each RAN providing air interface coverage according to a different air interface protocol. In such an arrangement, a UE may acquire connectivity with and be served by the first RAN and may at some point transition to instead connect with and be served by the second RAN. For instance, some existing hybrid systems include an LTE RAN (e.g., the LTE RAN discussed above) for data communications and a circuit-switched RAN, such as a CDMA RAN (or GSM RAN or the like), for legacy telephone service.

A UE that operates in a hybrid system may be configured as a single radio device, which utilizes the same radio system for communications on both networks in the hybrid system. In the context of a hybrid system utilizing LTE for data communications, a UE with the capability of using one radio system for both LTE communication and communication under at least one other protocol (e.g., CDMA) may be referred to as a single-radio LTE (SRLTE) device or an SRLTE UE. Similarly, when using a single radio system to engage in communication under LTE and at least one other protocol may be referred to as operating in an SRLTE mode.

When operating in a hybrid system, an SRLTE UE can register with both the LTE network and the CDMA network. However, when LTE service is available, an SRLTE UE will remain connected to the LTE network, except for cases when communication via the CDMA network is needed, such as tuning away to listen for pages or initiate a voice call via the CDMA network. As such, an SRLTE UE periodically disconnects from the LTE network and tunes to the CDMA network (e.g., at scheduled paging occasions) to check for any page messages directed to the UE from the CDMA network. If the SRLTE UE does not receive a page from the CDMA network, then UE, it will re-connect to the LTE network.

Overview

As noted above, an SRLTE UE may periodically tune its radio system away from LTE in order to check for page messages from the CDMA network (or a network using a different protocol Since the process of checking for CDMA page messages involves an SRLTE device disconnecting from the LTE network, an SRLTE device may have lower LTE throughput (e.g., as compared to a device that uses separate radio systems for LTE and CDMA communications). Accordingly, it is desirable to reduce the amount of time an SRLTE spends disconnected from an LTE network in order to listen for page messages from the CDMA network.

When a network utilizes CDMA2000 1×RTT or 1× Advanced for voice calls, a page concatenation feature may be implemented in an effort to more efficiently utilize the paging channel. When such a concatenation feature is utilized, multiple pages directed to different UEs may be concatenated and combined in a single page message, which may be referred to a general page message (GPM). When page concatenation is utilized in a coverage area, overhead and cyclic redundancy check (CRC) bits are omitted from pages, which in turn can reduce the paging success rate (PSR) in the coverage area. For an SRLTE UE, such a reduction in PSR can in turn increase the amount of time the SRLTE UE spends tuned away from LTE (e.g., due to the UE making multiple attempts to receive the same page message). Accordingly, exemplary embodiments may disable or reduce the usage of page concatenation for SRLTE devices.

Further, in some embodiments, page concatenation may be disabled or reduced for some, but not all, attempts to send a given page. For example, page concatenation may be disabled for the initial attempt to send a given page to UE, but enabled for any subsequent attempts to send the given page (e.g., any retransmissions of the page to UE). This implementation may help to balance the desire to reduce tune-away time for SRLTE devices (and increase PSR) with the desire to efficiently manage paging channel resources (e.g., by reducing PCO).

In one aspect, an exemplary method involves a network entity in a radio access network: (i) making a determination that a first UE is configured to use a single radio system for both (a) data communication under a first air interface protocol, and (b) voice calls under a second air interface protocol that is different from the first air interface protocol, wherein the first UE is located in a coverage area of the radio access network that is configured to apply a page concatenation feature to concatenate pages to multiple UEs in a single page message; (ii) based at least in part on the determination, selecting a page-concatenation level to be used to page the first UE, wherein the page-concatenation level is selected from a plurality of available page-concatenation levels; and (iii) transmitting at least on page message to the UE according to the selected page-concatenation level.

In another aspect, an exemplary system may be implemented in or take the form of one or more components of a radio access network, and includes a communication interface operable for voice communications under a first air interface protocol, a non-transitory computer readable medium, and program instructions stored on the non-transitory computer readable medium. The program instructions are executable by the at least one processor to: (i) make a determination that a first user equipment (UE) is configured to use a single radio system for both (a) data communication under a first air interface protocol, and (b) voice calls under a second air interface protocol that is different from the first air interface protocol, wherein the first UE is located in a coverage area of the radio access network that is configured to apply a page concatenation feature to concatenate pages to multiple UEs under the second air interface protocol in a single page message; (ii) based at least in part on the determination, select a page-concatenation level to be used to page the first UE, wherein the page-concatenation level is selected from a plurality of available page-concatenation levels; and (iii) transmit a page message to the UE according to the selected page-concatenation level.

In a further aspect, another exemplary method involves a network entity in a radio access network: (i) receiving a first page message for a voice call to a first UE under a second air interface protocol; (ii) receiving a second page message for a voice call to a second UE under the second air interface protocol, wherein the first and second page messages are for transmission in a first coverage area served by the network entity; (iii) determining that the first UE and the second UE are each configured to use a respective single radio system for both (a) data communication under a first air interface protocol, and (b) voice calls under the second air interface protocol, and responsively: scheduling the first page message in a first slot in a first paging slot cycle and the second page message in a second slot in the first paging slot cycle, wherein the first slot and the second slot are consecutive slots; and (iv) transmitting the first and second messages as scheduled during the first paging slot cycle.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

The present disclosure focuses by way of example on an arrangement including LTE and CDMA access networks and SRLTE devices operating in such a hybrid system. It will be understood, however, that the specifics shown and described are intended only as examples, and that numerous variations are possible. For instance, the principles discussed can be applied in an arrangement involving other types of access networks, other types of media systems, and/or other types of devices. Further, even within the examples disclosed, various elements (e.g. components and/or operations) can be rearranged, distributed, integrated, reordered, omitted, added, and otherwise modified.

I. EXEMPLARY NETWORK INFRASTRUCTURE

Figure 1A:
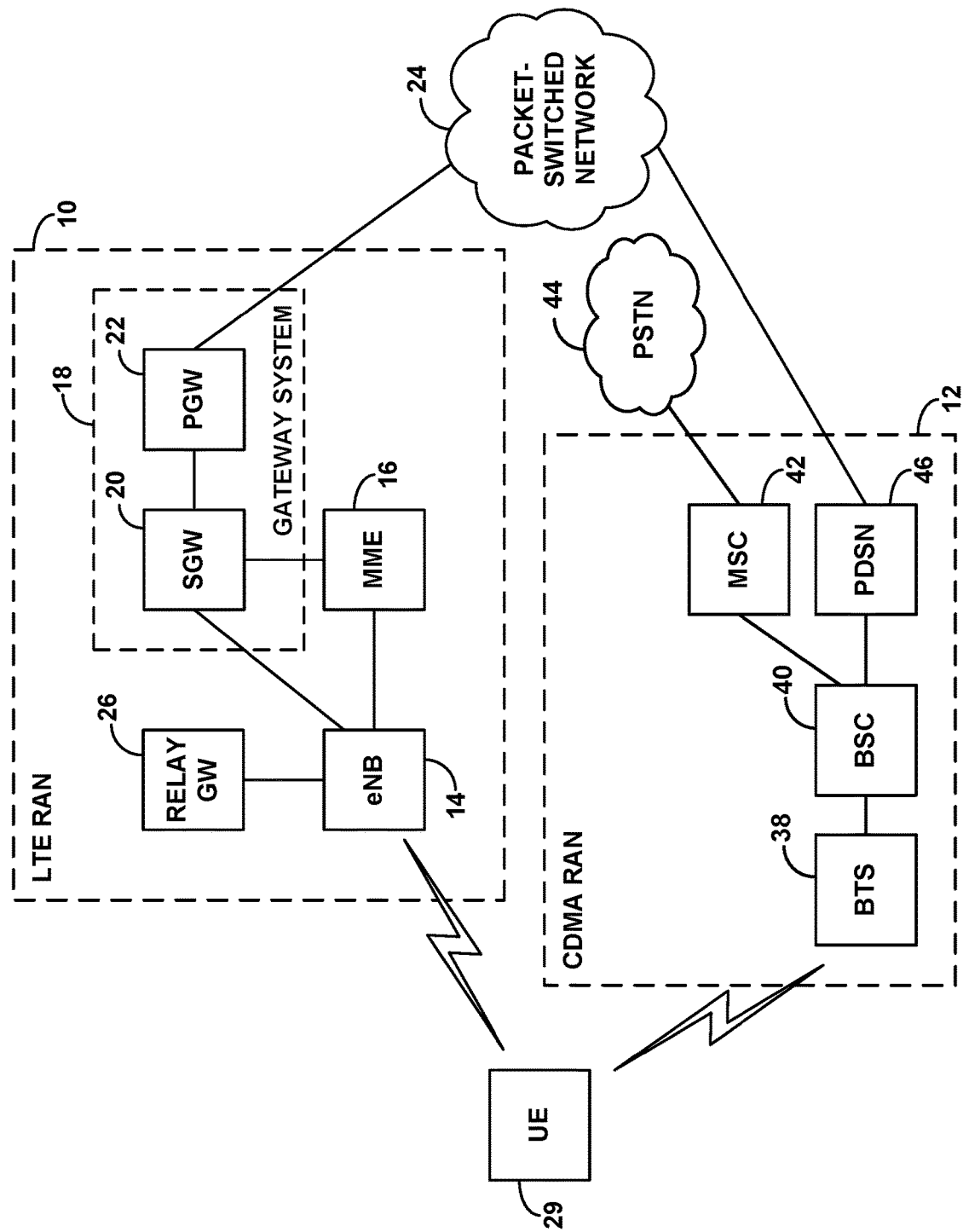
FIG. 1A is a simplified block diagram of an example wireless communication system, according to exemplary embodiments.

FIG. 1A is a simplified block diagram of an example wireless communication system in which the present method and system can be implemented. In particular, the example system includes an LTE RAN 10 and a CDMA RAN 12. In the example system, the LTE RAN functions primarily to serve UEs with wireless packet data communication service. Whereas the CDMA RAN primarily serves UEs with wireless circuit-switched voice call service but may also provide packet-data communication service and other types of service. The LTE RAN may be a packet-switched network, compliant with the industry standard SAE for the LTE protocol. Both of these RANs may be operated by a common wireless service provider or by different wireless service providers.

The LTE RAN 10 in the example system is shown including a representative LTE base station 14 known as an eNodeB (or "eNB"), which includes an antenna structure and associated equipment for providing LTE coverage in which to serve UEs. The eNodeB 14 then has a communication interface with an example MME 16, where the MME functions as a signaling controller for the LTE RAN 10. Further, eNodeB 14 has a communication interface with a gateway system 18, which includes a serving gateway (SGW) 20 and a packet-data-network gateway (PGW) 22, the PGW provides connectivity with a packet-switched transport network 24 such as the Internet, and the MME has a communication interface with the SGW 20 as well. As further shown, a UE 29 is within the coverage of eNodeB 14. A UE 29 may be any type of device capable of wireless communications via the LTE RAN 10 and/or the CDMA RAN 12, such as a mobile phone, tablet computer, laptop computer, car computer system, etc.

When a UE 29 enters into coverage of an LTE base station, such as eNodeB 14, the UE 29 may signal to the LTE base station to initiate an attachment process, and to establish for the UE a radio-link-layer connection (e.g., radio resource control (RRC) connection) with the LTE base station. The eNodeB 14 may then signal to the MME 16 so that the MME can authenticate UE 29 and obtain and store a context/profile record for UE 29. Further, the MME 16 engages in signaling with eNodeB 14 and the gateway system 18 to establish one or more bearers between UE 29 and the PGW 22. Further, PGW 22 assign to the UE an IP address for use on the packet-switched transport network 24.

In accordance with exemplary embodiments, the UE can also communicate via CDMA RAN 12. In FIG. 1A, the CDMA RAN 12 is shown including a representative CDMA base station 38 (also referred to as a base transceiver station (BTS)), which includes an antenna structure and associated equipment for providing CDMA coverage in which UEs can be served by the BTS and thus by the CDMA RAN. The BTS is then shown in communication with a base station controller (BSC) 40, which is in turn shown in communication with a mobile switching center (MSC) 42 that provides connectivity with the PSTN 44 and in communication with a packet data serving node (PDSN) 46 or gateway that provides connectivity with the packet-switched network 24. Other BTSs (not shown in FIG. 1A) may exist in this hybrid system as well, each providing CDMA coverage.

MSC 42 also includes or has access to mobile station registration data 66. The mobile station registration data 66 preferably comprises data that specifies where UEs are currently registered, such as the zone in which each UE is currently registered, among possibly other information. More specifically, the mobile station registration data 66 may take the form of a visitor location register (VLR) database, which holds a record per UE in the MSC's service area. The UE's current zone of registration can thus be indicated in the UE's VLR record. Alternatively or additionally, the UE registration data can take the form of a home location register (HLR) database that is accessible via the MSC 42. Still alternatively, registration data may be stored internally at the MSC and/or base stations, or elsewhere in some other form. In a further aspect, UE 29 is shown to be located within coverage areas of both the LTE RAN 12 and the CDMA RAN 10. In particular, UE 29 is located in an LTE coverage area of eNodeB 14 and in a CDMA coverage area of BTS 38. In the illustrated arrangement, UE 29 is a hybrid device) equipped to support both LTE service and CDMA service using the same radio system (e.g., an SRLTE device), and to selectively adjust the radio system to communicate with either LTE RAN 12 or the CDMA RAN 12.

Configured as an SRLTE UE, UE 29 may register with both the LTE RAN 10 (as described above, and with CDMA RAN 12. In order to register with CDMA RAN 12, UE 29 may detect a pilot signal broadcast by BTS 38 and responsively transmit a registration request message to the BTS, which the BTS may then forward (perhaps via the BSC 40) to the MSC 42. The MSC may then engage in signaling with an HLR to register the UE as being served by the MSC, so that calls to the UE can be connected to the UE via the MSC.

As an SRLTE device, UE 29 only connects to one network at a time, and may be configured to prefer LTE service by default. Thus, once the UE 29 is registered with LTE RAN 10 and CDMA RAN 12, the UE 29 may remain connected (e.g., in an RRC CONNECTED state) to the LTE RAN 10 by default, and tune away (e.g., disconnect) from the LTE RAN 10 only when necessary for CDMA communications. For example, UE 29 periodically tunes away from LTE RAN 10 to search for page messages from the CDMA RAN (for a UE-terminated call). UE 29 may also tune away from LTE RAN 10 to place a voice call to another device, and/or in other situations.

II. CDMA PAGING

As noted above, a CDMA network can use the same paging process for an SRLTE device as it is for does for a device that communicates exclusively via the CDMA network (rather than connecting to the LTE network primarily, and only periodically tuning back to the CDMA network). For ease of explanation, aspects of CDMA paging are described with reference to FIG. 1B, which illustrates additional aspects of a CDMA RAN 12. While FIG. 1B does not explicitly show RAN 12 as part of a hybrid network, it should be understood that RAN 12 may be part of a larger network, such as that illustrated in FIG. 1A. Further, it is noted that in practice, the combination of a BTS and a BSC (e.g., BTS 38 and BSC 40), or one or more BTSs and a BSC, may be referred to as a "base station." The term "base station" may also refer to a BTS on its own (e.g., BTS 38).

In a further aspect, a CDMA RAN 12, and in particular, a CDMA base station working with an exemplary MSC 42, may be configured to page one or more UEs by generating and transmitting a page message over one or more paging channels. In an exemplary embodiment, an access network will typically receive an indication that a UE 29 should be paged (e.g., an incoming call) or may itself determine that a UE 29 should be paged. An incoming call notification typically provides the access network with an identifier of the UE, such as a unique mobile identification number (MIN), a unique mobile directory number (MDN), and/or a unique International Mobile Subscriber Identity (IMSI), among other possibilities. The base station may then use the MIN or IMSI as a basis to determine the carrier air interface (CAI) transmit address fields, and encode these fields into a page record, which may then be placed in a page message for transmission in the zone in which the UE is registered (and possibly other paging zones as well).

In order to transmit a page message to a UE 29, a CDMA base station (e.g., BTS 38 and/or BSC 40), may be configured to create a page message that includes multiple pages, such that multiple UEs can be paged using a single page message. (For clarity, each individual page to a UE that is included in a larger "page message" may be referred to as "page record.") Before transmission, page records may be concatenated so that more page records may be included in a page message than otherwise could be. For example, using some existing page-concatenation processes, at least eight page records may be concatenated in a single General Page Message (GPM). Other existing page-concatenation processes provide for concatenation of at least five page records in a single GPM. Other concatenation techniques are also possible.

Without concatenation, a single page message that occupies two half frames in the paging channel, typically cannot include more than four page records. In comparison, some concatenation processes that allows for two page records to be concatenated in a GPM can be sent in two to three half frames, which allows for at least five page records to be sent in a single timeslot. Further, when concatenation processes that allows for two to eight page records to be concatenated in a GPM are utilized, a CDMA BTS 38 can transmit eight page records in a timeslot.

When multiple page records to multiple UEs are concatenated in a single GPM, some information which would otherwise be included in both page records is not repeated for each page record. For example, length bits, overhead bits, CRC bits, and reserved bits, are not repeated for each page record in a GPM. Thus, while concatenating page records into a GPM may reduce the load on the paging channel, thereby helping to reduce paging channel occupancy (PCO), concatenation may also result in some page records failing to reach their intended UEs, thus reducing the paging-success rate (PSR).

In exemplary embodiments, a network entity or entities, such as a CDMA base station, may be configured to vary the level of concatenation used to page different UEs. For example, a base station may dynamically determine whether each page record should be concatenated and included in a GPM (and perhaps the degree of concatenation that should be used), or sent in unconcatenated form. Other examples are also possible.

Figure 1B:
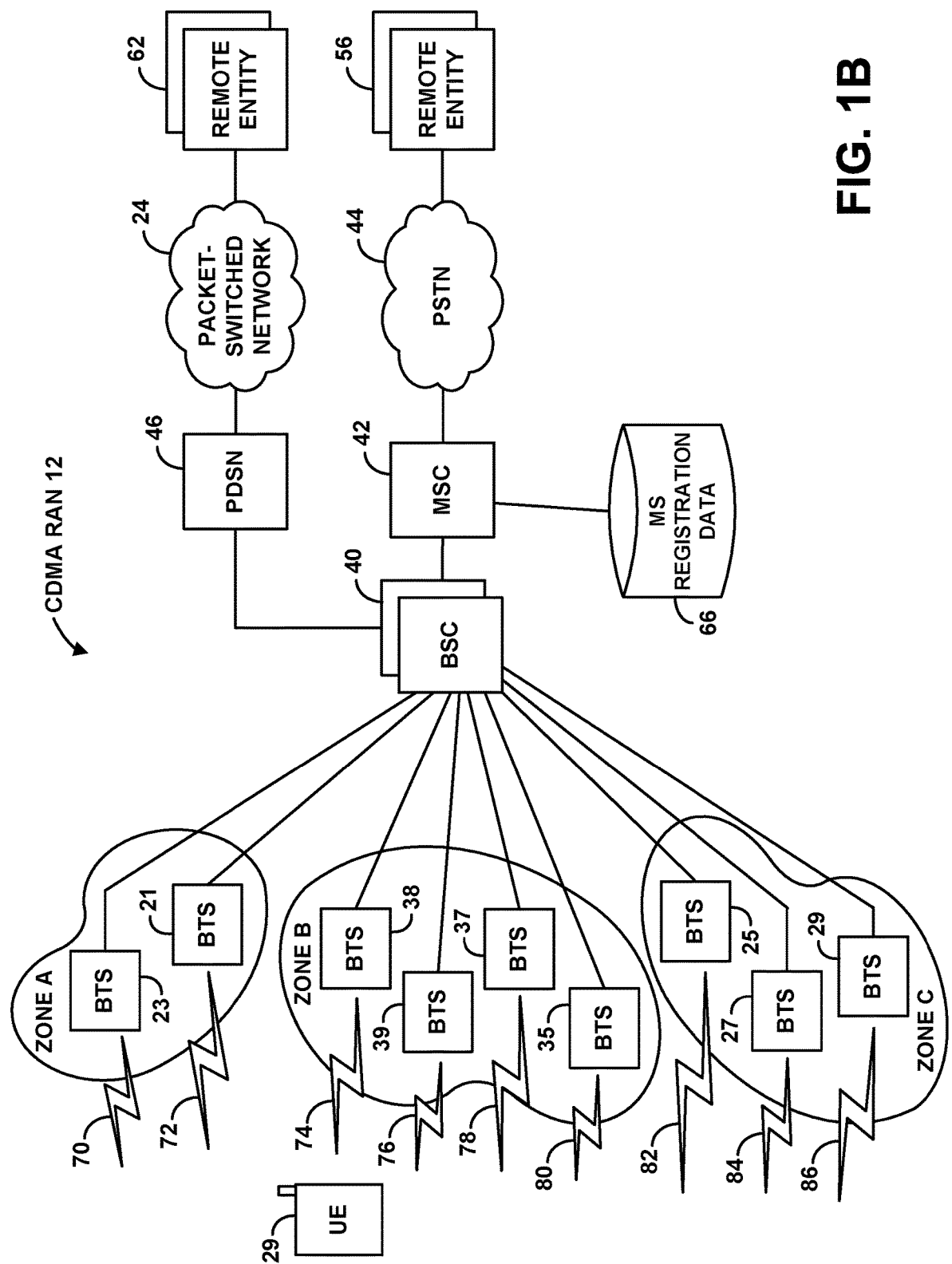
FIG. 1B illustrates additional aspects of the wireless communication system shown in FIG. 1A, according to exemplary embodiments.

In a further aspect of CDMA paging, a CDMA RAN 12 may be arranged to engage in a targeted paging process known as "zone-based paging." With zone-based paging, a cellular network is divided into paging zones, each with a respective zone ID, and paging is performed on a zone-basis. For example, as shown in FIG. 1B, the CDMA BTSs are grouped into zones A, B, and C to facilitate zone-based paging as described above. In particular, zone C includes BTS 25-29, zone A includes 31-33, and zone B includes 35-39.

Accordingly, when a CDMA RAN 12 seeks to page a UE 29 (e.g., for an incoming call or for some other reason), a switch, such as MSC 42, may send a page to numerous base stations in the switch's coverage area, such as BTSs 35-29, with the hope that when the base stations broadcast the page message, the UE will receive the page message in one of the associated sectors, and will respond.

To facilitate zone-based paging, each base station (e.g., each BTS 25-29, 31-33, 35-39) in the system may broadcast as one of its overhead parameters the zone ID for the zone in which the base station is located. Each BTS may broadcast a zone ID indicating its zone, and a mobile station such as mobile station 64 may monitor the zone IDs broadcast in the coverage areas where the mobile station is operating.

When a UE 29 detects a change in zone ID, the UE may then responsively register its presence in the new zone, so that the RAN 12 will then know to page the mobile station in that new zone. To register with the network, a UE may send a registration message via the access channel in its current sector, and a switch in the network would note the UE's registration and convey an indication of the registration to a home location register for later reference. With this process, the registration records thereby maintained by switches (e.g., MSC 42) and/or home location registers will indicate the paging zone in which each UE last registered. Further, in some embodiments, the UE can include an indication as to whether or not it is operating as an SRLTE device (e.g., a predetermined bit set to either 1 or 0) in the registration message.

When a switch (e.g., MSC 42) seeks to page a UE 29, the switch may then efficiently send the page message to just those base stations that are within the zone of the UE's last registration, as it is likely that the UE is in that zone. Further, MSC 42 may initially send the page message to the base stations in zones adjacent to the UE's zone of last registration, to cover the possibility that the UE has moved to a new zone but has not yet registered its presence in the new zone. Once the designated base stations transmit the page message, if the UE does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a UE 29. In particular, the network may first attempt to transmit a page record in the paging zone in which the UE is registered (i.e., the base stations in the paging zone in which the UE is registered transmit the page record). Then, if the first attempt is unsuccessful (i.e., the UE does not acknowledge the page record), the network makes a second attempt to page the UE by again transmitting the page record in the paging zone in which the UE is registered, and possibly in adjacent zones as well. If the second attempt also fails, then the network makes a third attempt to page the UE, which typically involves a system-wide transmission of the page record (i.e., in all paging zones), although it is possible that a third attempt may be of a different scope as well.

It should be understood exemplary embodiments are not limited to the zone-based paging processes described herein, and that other zone-based paging schemes are possible, without departing from the scope of the invention. Exemplary methods and systems could be implemented in the context of other paging processes where more than one attempt can be made to send a given page message to a UE, and possibly in systems where multiple paging attempts are not permitted.

When a paging scheme that involves re-sending pages is employed (e.g., zone-based paging as described above), the switch (e.g., MSC 42) from which a page is disseminated may track the "paging-attempt status" of a given page. The paging-attempt status for a given page may include or take the form of an "attempt count," which indicates how many attempts have been made to send a given page to a UE. For example, an MSC 42 may include or have access to database that tracks the paging-attempt status of pages initiated by the MSC. As such, when a page is successfully received at the intended mobile station, and a page response message is received by the base station from which the page was sent, this may be relayed to the MSC. MSC 42 then knows not to initiate additional attempts to send the page and refrains from making additional attempts to send the page. On the other hand, if MSC 42 does not receive an indication that the page was successful from any BTS, MSC 42 will check the paging-attempt status, and if appropriate, send the page to base stations according to the zone-based paging scheme.

In a further aspect, a switch such as MSC 42 may be configured to provide the paging attempt status of a given page to the base stations that it sends a page to (e.g., to BTSs 35-39 via BSC 40). For example, an MSC may include in or associate an indication of the attempt count with a page, when it sends a page to a base station. An MSC may provide the paging attempt status of a page to a base station using other techniques as well.

III. EXEMPLARY NETWORK COMPONENTS

Figure 2:
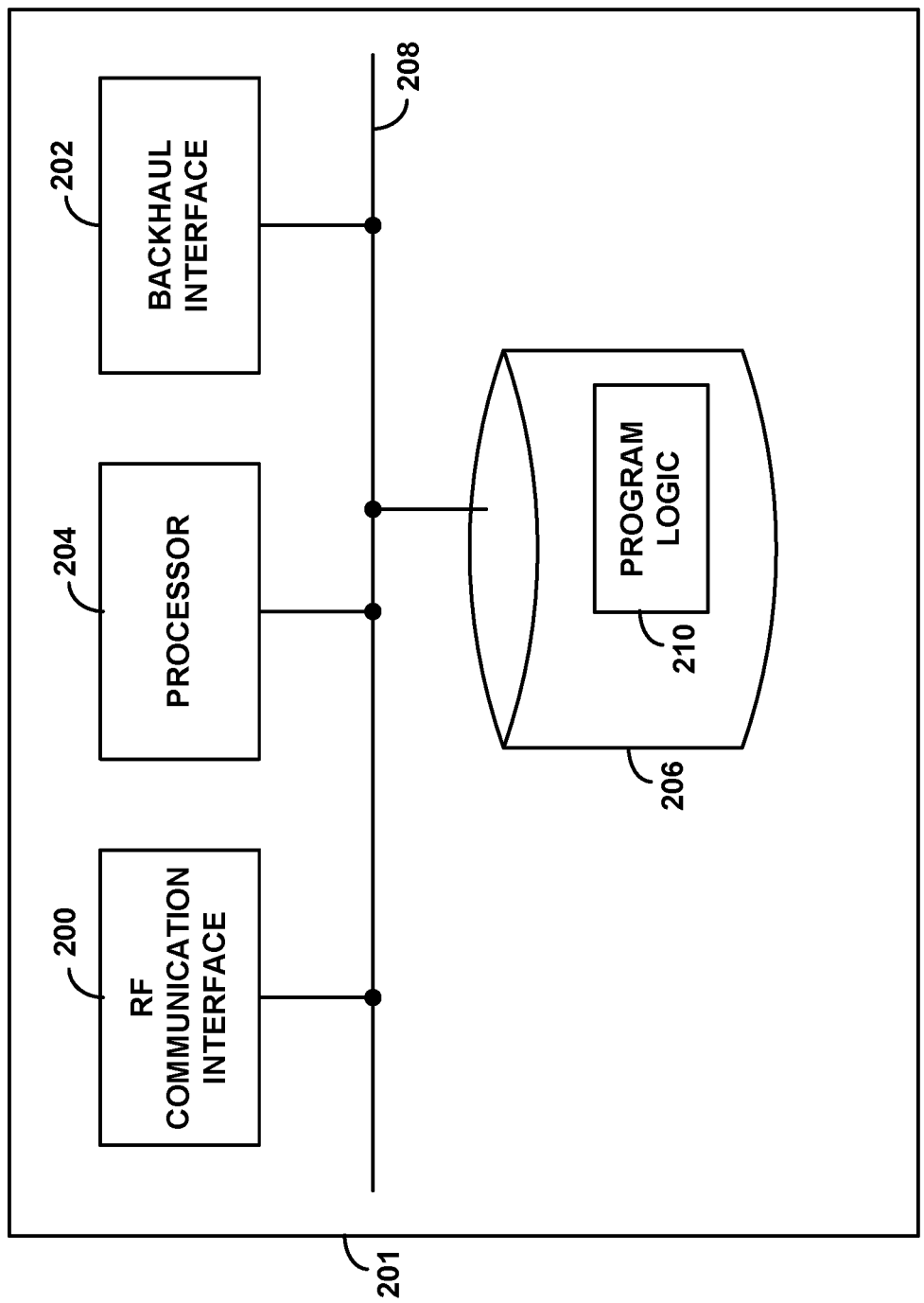
FIG. 2 is a simplified block diagram exemplifying a network component, according to an exemplary embodiments.

FIG. 2 is a simplified block diagram exemplifying a RAN component, according to an exemplary embodiment. In particular, FIG. 2 illustrates functional components that might be found in a RAN component 201 that is arranged to operate in accordance with the embodiments herein. As shown, the RAN component 201 may include a communication interface 200, a backhaul interface 202, a processor 204, and data storage 206, all of which may be communicatively linked together by a system bus, network, or one or more other connection mechanisms 208.

In practice, RAN component 201 may take the form of a base station (e.g., a BTS, BSC, or combination thereof), or may take the form of another component of a CDMA network and/or an LTE network. Further, the illustrated components of RAN component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In RAN component 201, communication interface 200 may comprise one or more or wired or wireless communication interfaces and/or other associated equipment for engaging in communications with other network entities and/or for engaging in RF communications with UEs according to one or more air interface protocols. Backhaul interface 202 may comprise any sort of communication link or mechanism enabling the RAN component 201 to exchange signaling and bearer data with other network entities. Further, processor 204 may comprise one or more processors (e.g., general purpose and/or special purpose processors), such as microprocessors for instance.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

IV. EXEMPLARY METHODS

Figure 3:
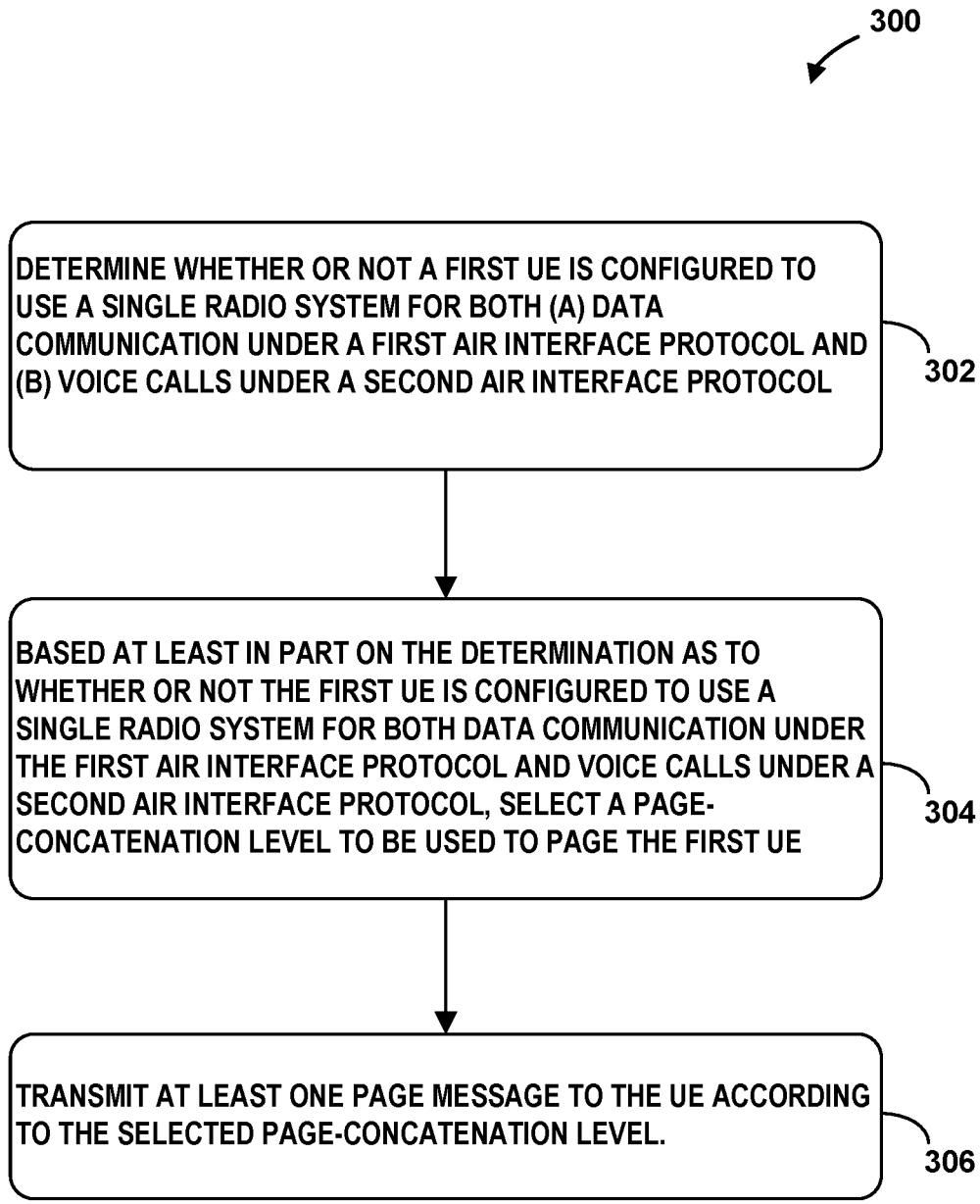
FIG. 3 is flow chart illustrating an exemplary method.

FIG. 3 is flow chart illustrating a method 300, according to an exemplary embodiment. Method 300 is described by way of example as being implemented by a CDMA base station (e.g., a BTS). However, method 300 or variations thereof could be implemented by a CDMA base station, a CDMA switch, a combination of a CDMA base station and switch, or another entity or combination of entities in a RAN. Further, it should be understood that method 300 may be implemented for purposes other than those explicitly described herein, without departing from the scope of the invention.

As shown by block 302, method 300 involves a base station making a determination as to whether or not a first UE is configured to use a single radio system for both (a) data communication under a first air interface protocol (e.g., an LTE protocol), and (b) voice calls under a second air interface protocol (e.g., a CDMA protocol). In an exemplary embodiment, the first air interface protocol is an LTE protocol, while the second air interface protocol is a CDMA protocol. As such, block 302 may involve determining that the UE is operating as an SRLTE device.

Then, based at least in part on the determination as to whether or not the first UE is configured to use a single radio system for both data communication under the first air interface protocol and voice calls under a second air interface protocol, the base station selects a page-concatenation level to be used to page the first UE, wherein the page-concatenation level is selected from a plurality of available page-concatenation levels, as shown by block 304 The base station may then transmit at least one page message to the UE according to the selected page-concatenation level, as shown by block 306.

A. Determining that a UE is a Single-Radio Device

At block 302, various techniques may be utilized by the network entity to determine that a UE is configured to use a single radio for communications under different protocols for data and voice. For ease of explanation, aspects of method 300 are described with reference to the implementation where block 302 involves determining that a UE is configured to operate as an SRLTE device, which uses an LTE protocol for data communications, and a CDMA protocol for voice calls. However, it should be understood that block 302 could be applied with respect to any UE that is configured to use a single radio system for both (a) data communication under a first air interface protocol, and (b) voice calls under a second air interface protocol that is different from the first air interface protocol, and is not limited to SRLTE devices.

In some embodiments, a CDMA base station could maintain and/or have access to data records indicating whether or not a UE in the coverage areas it serves are configured to operate as an SRLTE device. To facilitate the creation and/or maintenance of such data records, a UE may be configured to notify the CDMA network that the UE is operating as an SRLTE device.

Accordingly, method 300 could further involve a network entity (e.g., a BTS) initially receiving a message from the UE indicating the UE is configured to use a single radio system for both data communication under the first air interface protocol and voice calls under the second air interface protocol. For instance, when an SRLTE UE registers with or sends an origination message to the CDMA RAN, the UE may include an indication that it is operating as an SRLTE device. In a CDMA RAN where zone-based paging is utilized, the UE may indicate it is operating as an SRLTE device when it registers in a new zone (e.g., in a zone registration message). Of course, a UE may additionally or alternatively include such information in other types of messages sent to the CDMA RAN.

When a base station (e.g., a BTS) receives such a message from a UE, the base station may update its data records for the particular UE, to reflect the fact the UE is an SRLTE device. In such embodiments, the base station may maintain and update local data records indicating whether or not UEs in its coverage area(s), or may have access to such data records stored elsewhere.

Additionally or alternatively, when a UE indicates it is operating as an SRLTE device (e.g., via a registration or origination message), the BTS may relay this information to the MSC. As such, method 300 could further involve the network entity (e.g., the MSC) initially receiving, via another network entity (e.g., a BTS), a message indicating that the first UE is configured to use a single radio system for both data communication under the first air interface protocol and voice calls under the second air interface protocol. The MSC can then update data records for the particular UE, to reflect the fact the UE is an SRLTE device. As an example, the MSC could update its entry in a paging table used for zone-based paging to indicate that the UE is an SRLTE device. In some embodiments, this could involve updating an entry for the UE in an HLR and/or VLR.

In any of the above scenarios, the network entity may access the data records for a given UE when a page is received for the given UE, in order to determine whether or not the given UE is operating as an SRLTE device. Accordingly, method 300 could further involve the network entity (e.g., a BTS or MSC) receiving a page for a voice call directed to the first UE, and performing method 300 in response to receipt of the page directed to the first UE.

B. Selecting a Page-Concatenation Level

At block 304 of method 300, the selection of a page-concatenation level to be used by the UE, from a plurality of available page-concatenation levels, may be based at least in part on the determination as to whether or not a UE is operating as an SRLTE device.

In some embodiments, the selection of a page-concatenation level may a binary choice between concatenating a page record, and not concatenating a page record. In practice, this may be accomplished by either concatenating and including the page record to the UE in a GPM, or sending the page record to the UE in an unconcatenated form (which is thus not included in a GPM).

More specifically, when it is determined at block 302 that the first UE is configured to use a single radio system for both data communication under a first air interface protocol and voice calls under a second air interface protocol (e.g., that the first UE is an SRLTE device), the base station may initiate a process to disable use of the page concatenation feature for at least one page message sent to the first UE under the second communication protocol. This process may simply involve assigning subsequent page record(s) to the first UE to a paging slot cycle(s) designated for page records that have not been concatenated. On the other hand, when it is determined at block 302 that the first UE is not configured to use a single radio system for both data communication under a first air interface protocol and voice calls under a second air interface protocol (e.g., that the first UE is not an SRLTE device), the base station may refrain from concatenating subsequent page records to the first UE. (Note that in this embodiment, one of the two or more page-concatenation levels results in no concatenation.) In some embodiments, selection of the page-concatenation level may be more granular;

e.g., selecting from three or more different levels of concatenation (one of which may result in no concatenation). In such embodiments, the selection of the page-concatenation level may be based on one or more other factors may in addition to whether or not a UE is an SRLTE device. Within the context of such multi-factor selection, the base station will tend to apply less (or no) concatenation, e.g., by including page records in a GPM with a lesser number of page records (or no other page records), for an SRLTE device, as compared to a non-SRLTE device, all other factors being the same.

Further, in some embodiments, the selection of the page-concatenation level may be performed for a specific attempt to page a UE. In such embodiments, the base station may repeat the selection process each time a page record is received for transmission to a UE. Further, when the page-concatenation level is selected on a per-attempt basis, the selection process may be based on a combination of a UE's SRLTE configuration (e.g., whether or not the UE is configured as an SRLTE device) and the attempt count for the given page.

C. Bundling Unconcatenated Page Records

In a further aspect, to more efficiently utilize paging channel resources in scenarios where SRLTE device(s) and non-SRLTE devices(s) are to be paged during the same paging slot cycle, a CDMA base station may group or "bundle" unconcatenated page records to SRLTE devices in consecutive timeslots. Bundling unconcatenated page records in a given slot cycle can in turn increase the number of consecutive slots in the given slot cycle that are available for GPMs (preferably providing a single group of consecutive slots that can be used to send GPMs). Since a single GPM (including multiple concatenated page records) may be sent over multiple timeslots, such bundling may allow for a base station to more efficiently utilize paging channel resources.

Figure 4:
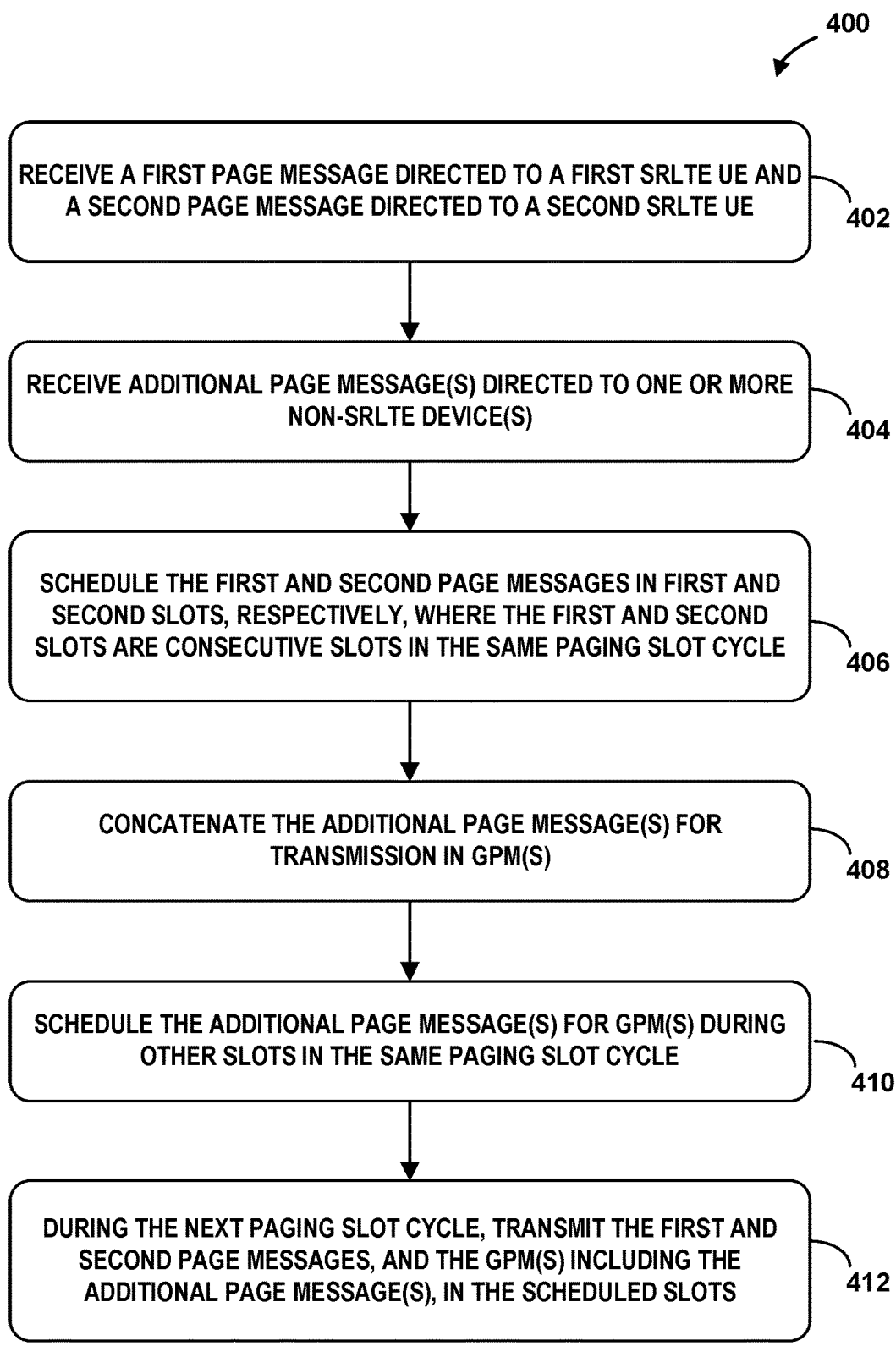
FIG. 4 is another flow chart illustrating another exemplary method.

For example, FIG. 4 is a flow chart illustrating another method 400, according to an exemplary embodiment. For explanatory purposes, method 400 may be described herein as being carried out by a CDMA base station (e.g., a BTS and/or a BSC). Of course, it should be understood that method 400 or portions thereof may be implemented by other entities (e.g., an MSC) or combinations of entities, and/or may be implemented for purposes other than those described herein, without departing from the scope of the invention.

As shown by block 402, method 400 involves a base station receiving a first page message directed to a first UE, and a second page message directed to a second UE, which are both configured as SRLTE devices. The base station also receives one or more additional page messages directed to one or more UEs that are not configured for SRLTE communications, as shown block 404.

Further, the timing of the page messages received at blocks 402 and 404 is such that the base station can send all of the page messages during the same paging slot cycle (e.g., the next slot cycle). As such, the base station schedules the first page message and the second page message in a first slot and a second slot, respectively, where the first slot and the second slot are consecutive slots in the same paging slot cycle (e.g., in the next paging slot cycle), as shown by block 406. Further, if other unconcatenated pages messages are to be scheduled for transmission to SRLTE devices in the same paging slot cycle, the base station may schedule these page messages such that all unconcatenated pages messages are scheduled for consecutive slots.

At block 408, the base station concatenates the one or more additional page messages for transmission in a GPM or possibly in multiple GPMs during the paging slot cycle. Additionally, the base station schedules the one or more additional page messages for one or more transmission in GPMs during other slots in the same paging slot cycle, as shown by block 410. The base station then transmits the first page message and the second page message, and the GPM(s) including the one or additional page messages as scheduled during the next paging slot cycle, as shown by block 412.

D. Selection of a Page-Concatenation Level Based on SRLTE Configuration and Attempt Count As noted above, when zone-based paging is implemented, a CDMA RAN may be configured to make up to a predetermined number of attempts to successfully page the first UE for a voice call. Furthermore, since disabling or reducing the extent of concatenation for a given page record will typically increase the bandwidth utilized for the transmission of the given page record. As such, disabling or reducing the extent of concatenation for a large number of page records in a coverage area may undesirably increase the PCO in the coverage area. In order to balance the desire to increase the PSR and in turn reduce the time an SRLTE spends tuned away from the LTE network, with the desire to manage PCO, some embodiments may disable or reduce the extent of concatenation for some, but not all, attempts to send a given page to an SRLTE device.

Figure 5:
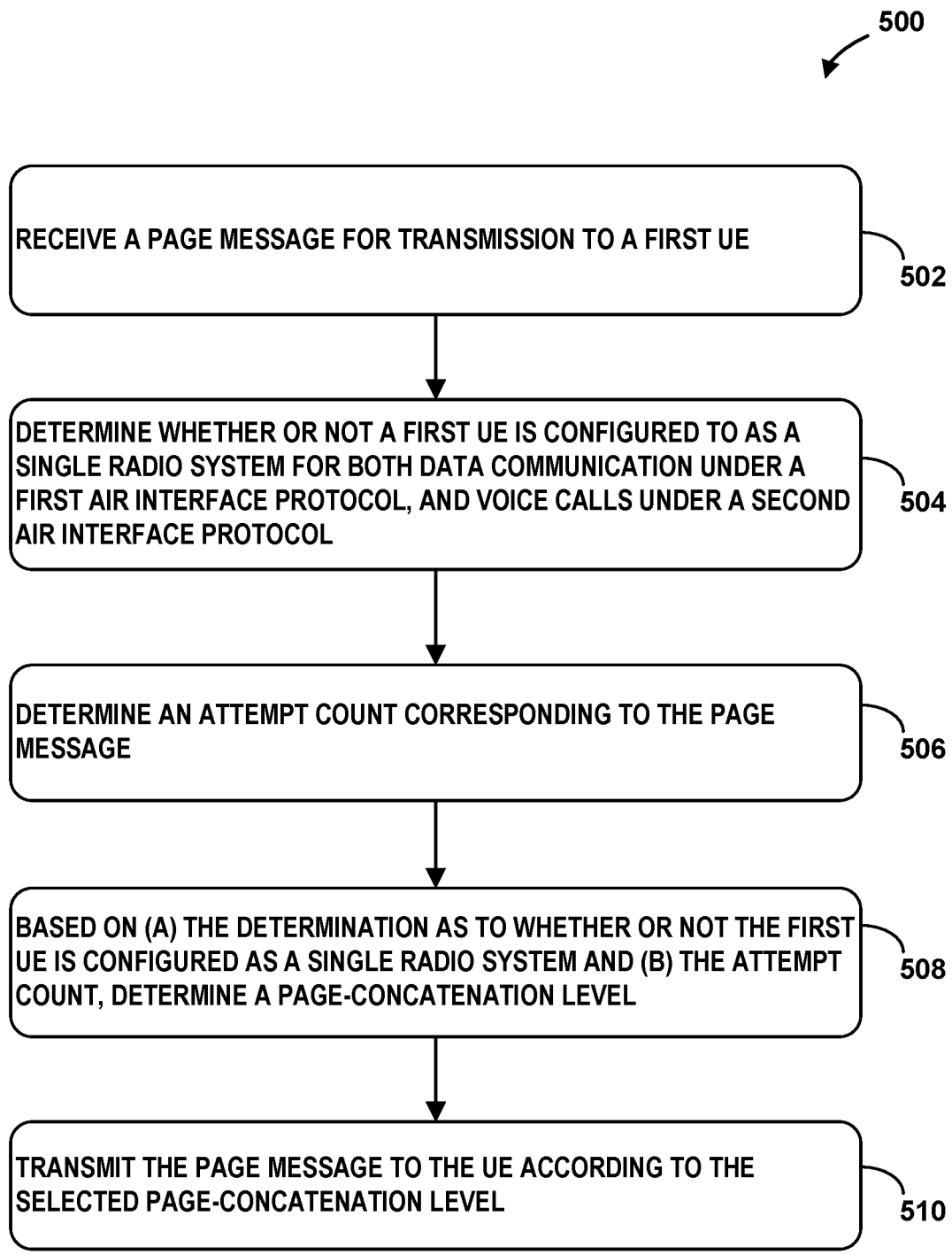
FIG. 5 is yet another flow chart illustrating yet another exemplary method.

More generally, FIG. 5 is a flow chart illustrating another method 500, according to an exemplary embodiment. Method 500 can be implemented in order to select a page-concatenation level for a given paging attempt, based on a combination of a UE's configuration (e.g., as an SRLTE or non-SRLTE device) and the attempt count for the given page. Note that method 500 may be implemented by a network entity or entities from a radio access network, such as a base station (e.g., BTS and/or BSC), and/or a switch (e.g., an MSC), among other possibilities. For explanatory purposes, method 500 is described herein as being carried out by a CDMA base station entity, which is part of a hybrid system including a CDMA network and an LTE network, where the CDMA network is configured to make up to a predetermined number of attempts to successfully page the first UE for a given voice call. It should be understood that method 500 or portions thereof may be implemented by other entities or combinations of entities, and/or may be implemented for other purposes, without departing from the scope of the invention.

As shown, block 502 of method 500 involves a base station receiving a page message for transmission to a first UE. For instance, block 502 could involve a base station (e.g., BTS and/or BSC) receiving a page message from a switch (e.g., an MSC). Alternatively, when method 500 or portions thereof are implemented by an MSC, block 502 could involve the MSC receiving the page message for transmission to the first UE.

At block 504, the base station determines whether or not a first UE is configured to as a single radio system for both data communication under a first air interface protocol, and voice calls under a second air interface protocol that is different from the first air interface protocol. In an exemplary embodiment, this determination may involve determining whether or not the first UE is configured to operate as an SRLTE device. Generally, block 504 may be implemented in the same or a similar manner as described above in reference to block 404 of method 400.

Further, at block 506, the network entity determines an attempt count (e.g., a paging-attempt status) corresponding to the page message. The attempt count may indicate the number of attempts that will have been made once the next paging attempt is made, or the number of attempts that have already been made. For instance, in the former implementation, when a second attempt is about to be made to send a given page message to a given UE, the attempt count for the given page message will be equal to two (reflecting the fact that the page about to be sent is the second attempt). In the latter implementation, when a second attempt is about to be made to send a given page message to a given UE, the attempt count for the given page message will be equal to one (reflecting the fact that one attempt has already been made). In any such case, when a CDMA MSC or base station receives the page message directed to the first UE, the MSC or base station may determine the paging-attempt status of the page message as described elsewhere herein. Of course, other techniques for determining the attempt count corresponding to a given page message are also possible.

Further, in the case of zone-based paging or any other scenario where multiple base stations can send the same page message, the MSC may indicate the attempt count corresponding to a page message, and/or may indicate whether or not the first UE is configured as an SRLTE device, to all base stations to which it sends a given page message (e.g., all base stations serving at least one coverage area in the paging where the page message will be sent). Additionally or alternatively, when a base station performs method 500, the base station (e.g., a BTS and/or BSC) could track or have access to a database providing the attempt count for page messages to UEs in coverage area(s) served by the base station. In this case, the MSC may not indicate the attempt count to the base station.

Continuing now to block 508, based on (a) the determination as to whether or not the first UE is configured as a single radio system and (b) the attempt count, the network entity determines the page-concatenation level for the particular attempt to send the page message to the first UE. The base station may then transmit the page message to the UE according to the selected page-concatenation level, as shown by block 510.

In some cases, the selection process implemented at block 508 may be designed to increase the probability that a page is received on the first attempt (or on an earlier attempt). For example, when it is determined that a given UE is an SRLTE device, the base station may disable concatenation the first attempt to send a page to the given UE, and enable concatenation on subsequent attempts to send the same page message. As another example, when it is determined that a given UE is an SRLTE device, the base station may disable concatenation the first and second attempts to send a given page to a UE, and enable concatenation on subsequent attempts to send the same page (e.g., on a third and final attempt). In other cases, the selection process at block 508 may be designed to increase the probability that a final attempt to send a page is successful (e.g., by applying concatenation to the first and possibly the second attempt to send a given page, and disabling concatenation for the third attempt). Other selection processes and variations on the above described processes are also possible.

V. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   making a determination, by a network entity in a radio access network, that a first user equipment (UE) is configured to use a single radio system for both (a) data communication under a first air interface protocol, and (b) voice calls under a second air interface protocol that is different from the first air interface protocol, wherein the first UE is located in a coverage area of the radio access network that is configured to apply a page concatenation feature to concatenate pages to multiple UEs in a single page message;
   based at least in part on the determination, selecting a page-concatenation level to be used to page the first UE, wherein the page-concatenation level is selected from a plurality of available page-concatenation levels; and
   transmitting at least on page message to the UE according to the selected page-concatenation level.

2. The method of claim 1, wherein selecting the page-concatenation level to be used to page the first UE comprises:
   responsive to the determination that the first UE is configured to use a single radio system for both data communication under a first air interface protocol and voice calls under a second air interface protocol, initiating a process to disable use of the page concatenation feature for at least one page message sent to the first UE under the second communication protocol.

3. The method of claim 2, wherein the radio access network is configured to make up to a predetermined number of attempts to successfully page the first UE for a voice call under the second air interface protocol, and wherein the process to disable use of the page concatenation feature for paging to the first UE under the second communication protocol disables page concatenation for at least a first attempt to send a page to the first UE for a voice call under the second air interface protocol.

4. The method of claim 1, wherein first air interface protocol is a Long Term Evolution (LTE) protocol, and wherein the second air interface protocol is code division multiple access (CDMA) protocol.

5. The method of claim 3, wherein, to operate as an SRLTE device, the first UE is configured to:
   periodically switch from a connected state to a disconnected state under the first air interface protocol; and
   when disconnected under the first air interface protocol, monitor a paging channel defined under the second air interface protocol for a page message indicating an incoming voice call for the first UE.

6. The method of claim 1, wherein making the determination that the first UE is configured to use a single radio system for both (a) data communication under the first air interface protocol, and (b) voice calls under the second air interface protocol comprises:
   determining that the first UE is configured to operate as Single Radio LTE (SRLTE) device.

7. The method of claim 1, wherein making the determination that the first UE is configured to use a single radio system for both data communication under the first air interface protocol and voice calls under the second air interface protocol comprises:
   initially receiving, by the network entity, a message from the UE indicating the UE is configured to use a single radio system for both data communication under the first air interface protocol and voice calls under the second air interface protocol.

8. The method of claim 7, wherein the received message comprises a registration message that registers the UE in a particular paging zone from a plurality of paging zones.

9. The method of claim 1, wherein selecting the page-concatenation level to be used to page the first UE comprises:
   initiating a process that causes a page to the first UE under the second communication protocol to be sent in a time slot designated for an unconcatenated page to a single UE.

10. The method of claim 9, wherein the time slot in which the page to the first UE is scheduled in a paging slot cycle where a general page message (GPM) is scheduled in at least one other time slot, wherein two or more pages for different UEs are concatenated in the GPM.

11. The method of claim 1, wherein the method is performed in response to receipt of a page message for transmission to the first UE, the method further comprising:
   determining an attempt count corresponding to the page message for transmission to the first UE; and
   using the attempt count as a further basis for determining the page concatenation level for the first UE, wherein the determined page concatenation level is applied for transmission of the page message.

12. The method of claim 11, wherein using the attempt count as a further basis for determining the page concatenation level for the first UE comprises:
   when the attempt count indicates the received page message is a first attempt, disabling page-concatenation for transmission of the page message to the first UE; and
   otherwise, enabling page concatenation for transmission of the page message to the first UE.

13. The method of claim 11, wherein the method of claim 11 is performed each time a page message is received for transmission to the first UE.

14. A method comprising:
   making a determination, by a network entity in a radio access network, that a first user equipment (UE) is configured to use a single radio system for both (a) data communication under a first air interface protocol, and (b) voice calls under a second air interface protocol that is different from the first air interface protocol, wherein the first UE is located in a coverage area of the radio access network that is configured to apply a page concatenation feature to concatenate pages to multiple UEs in a single page message;

based at least in part on the determination, selecting a page-concatenation level to be used to page the first UE, wherein the page-concatenation level is selected from a plurality of available page-concatenation levels; and transmitting at least on page message to the UE according to the selected page-concatenation level;

wherein making the determination that the first UE is configured to use a single radio system for both data communication under the first air interface protocol and voice calls under the second air interface protocol comprises:

initially receiving, from another network entity, a message indicating that the UE is configured to use a single radio system for both data communication under the first air interface protocol and voice calls under the second air interface protocol.

15. A system comprising:

a communication interface operable for voice communications under a first air interface protocol;

a non-transitory computer readable medium; and program instructions stored on the non-transitory computer readable medium and executable by at least one processor to:

(i) make a determination that a first user equipment (UE) is configured to use a single radio system for both (a) data communication under a first air interface protocol, and (b) voice calls under a second air interface protocol that is different from the first air interface protocol, wherein the first UE is located in a coverage area of the radio access network that is configured to apply a page concatenation feature to concatenate pages to multiple UEs under the second air interface protocol in a single page message;

(ii) based at least in part on the determination, select a page-concatenation level to be used to page the first UE, wherein the page-concatenation level is selected from a plurality of available page-concatenation levels; and (iii) transmit a page message to the UE according to the selected page-concatenation level.

\* \* \* \* \*